(12) United States Patent
Iseki et al.

(10) Patent No.: US 7,018,543 B2
(45) Date of Patent: Mar. 28, 2006

(54) WASTE WATER TREATING METHOD AND WASTE WATER TREATING APPARATUS

(75) Inventors: Masahiro Iseki, Gunma (JP); Mineo Ikematsu, Ibaraki (JP); Naoki Hiro, Osaka (JP); Tomohito Koizumi, Gunma (JP); Tsuyoshi Rakuma, Gunma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 134 days.

(21) Appl. No.: 10/338,040

(22) Filed: Jan. 8, 2003

(65) Prior Publication Data

US 2003/0150819 A1     Aug. 14, 2003

(30) Foreign Application Priority Data

Feb. 8, 2002     (JP) ............................. 2002-032748

(51) Int. Cl.
     *C04F 1/72*     (2006.01)

(52) U.S. Cl. ..................... 210/748; 210/756; 210/760; 210/198.1; 210/903; 210/906

(58) Field of Classification Search ............... 210/748, 210/754, 756, 758, 760, 198.1, 903, 906
See application file for complete search history.

(56) References Cited

U.S. PATENT DOCUMENTS

| 5,435,894 | A | * | 7/1995 | Hayakawa | 205/744 |
| 5,437,776 | A | * | 8/1995 | Schwabegger et al. | 205/761 |
| 5,858,249 | A | * | 1/1999 | Higby | 210/748 |
| 6,132,627 | A | * | 10/2000 | Joko et al. | 210/748 |
| 6,398,968 | B1 | * | 6/2002 | Higby | 210/721 |

* cited by examiner

*Primary Examiner*—Betsey Morrison Hoey
(74) *Attorney, Agent, or Firm*—Amstrong, Kratz, Quintos, Hanson & Brooks, LLP

(57) ABSTRACT

An object of the present invention is to provide a waste water treating method and a waste water treating apparatus which are capable of treating for-treatment water containing a nitrogen compound and a phosphorus compound at low costs and efficiently. The waste water treating method is a waste water treating method for treating a nitrogen compound (nitrate nitrogen) and a phosphorus compound (phosphate ions) in for-treatment water by electrolysis as an electrochemical process, the method comprises a first treating step of immersing a pair of electrodes in the for-treatment water at least partially so as to treat the for-treatment water by electrolysis, one of the electrodes being a cathode made of a conductive material and the other of the electrodes being an anode made of iron, and a second treating step of treating the for-treatment water with hypochlorous acid, ozone or active oxygen after completion of the first treating step.

12 Claims, 5 Drawing Sheets

WASTE WATER TREATING METHOD AND WASTE WATER TREATING APPARATUS

BACKGROUND OF THE INVENTION

1. Field of the Invention

The present invention relates to an apparatus for treating waste water containing a phosphorus compound such as phosphoric acid or phosphate ions and a nitrogen compound such as organic nitrogen, nitrite nitrogen, nitrate nitrogen and ammonia nitrogen.

2. Description of the Related Art

It has heretofore been well known that existence of a nitrogen compound and a phosphorus compound is one of causes of eutrophication of rivers and lakes. These phosphorus compound and nitrogen compound exist in domestic waste water and industrial waste water in large amounts and are difficult to purify, and currently no effective measures can be taken against these compounds. In general, to treat waste water containing the nitrogen compound, biological treatment is implemented. The biological treatment comprises two steps, i.e., a nitrification step of converting ammonia nitrogen to nitrate nitrogen and a denitrification step of converting nitrate nitrogen to a nitrogen gas.

Meanwhile, a variety of techniques for treating the phosphorus compound have been proposed, and a lime agglomeration/precipitation technique is known for domestic waste water. This is a technique for removing phosphate ions in water to be treated (hereinafter, "water to be treated" will be referred to as "for-treatment water") by causing the phosphate ions to react with calcium ions so as to agglomerate and precipitate the phosphate ions as calcium hydroxyapatite which is a water-insoluble salt.

However, an apparatus used for treating the nitrogen compound and the phosphorous compound in the conventional biological treatment has problems that it requires two independent reaction vessels and that because the treatment proceeds slowly, the efficiency of the treatment is low. Further, the conventional technique has a problem that it requires a large-capacity apparatus since it does not treat a nitrogen compound and a phosphorus compound which are contained in for-treatment water simultaneously.

Further, in the biological treatment, there is another problem that large-capacity aerobic and anaerobic vessels are required for keeping nitrifying bacteria and denitrifying bacteria, thereby inducing an increase in equipment construction costs and an apparatus installation area. There is still another problem that since the denitrifying bacteria are significantly influenced by an ambient temperature environment, components contained in for-treatment water and the like, and in particular, during the winter season when the temperature is low, their activities and denitrifying action are lowered, resulting in unstable treatment efficiency.

In addition, in the above technique for treating the phosphorus compound, since the pH of the for-treatment water after the condensation/precipitation of the phosphorus compound is high, the alkaline for-treatment water resulting from the treatment of the phosphorus compound must be neutralized. Further, the technique also has a problem that maintenance is difficult due to a large amount of lime used.

SUMMARY OF THE INVENTION

Under the circumstances, the present invention has been conceived to solve the technical problems of the prior art. An object of the present invention is to provide a waste water treating method and waste water treating apparatus which can treat for-treatment water containing a nitrogen compound and a phosphorus compound at low costs and efficiently.

The present invention is a waste water treating method for treating a nitrogen compound and a phosphorus compound in for-treatment water, which comprises:

a first treating step of immersing a pair of electrodes in the for-treatment water at least partially so as to treat the for-treatment water by an electrochemical process, one of the electrodes being a cathode made of a conductive material and the other of the electrodes being an anode made of iron, and a second treating step of treating the for-treatment water with hypochlorous acid, ozone or active oxygen after completion of the first treating step.

According to the present invention, by carrying out the first treating step in which a pair of electrodes, one of which is a cathode made of a conductive material and the other of which is an anode made of iron, are at least partially immersed in for-treatment water so as to treat the for-treatment water by an electrochemical process, iron(II) ions are eluted into the for-treatment water from the electrode serving as the anode, and iron(III) ions obtained by oxidation of the iron(II) ions in the for-treatment water chemically react with phosphate ions as a phosphorus compound in the for-treatment water, whereby the phosphorus compound in the for-treatment water can be precipitated as an iron phosphate.

Further, it becomes possible to reduce, in the for-treatment water or at the cathode, nitrate ions as a nitrogen compound in the for-treatment water to nitrite ions and ammonia or ammonium ions.

In addition, since the second treating step in which the for-treatment water is treated with hypochlorous acid, ozone or active oxygen is carried out after completion of the first treating step, the ammonia or ammonium ions produced in the for-treatment water can be denitrified into a nitrogen gas efficiently.

Further, in the waste water treating method of the present invention, hypochlorous acid, ozone or active oxygen is added to the for-treatment water in the second treating step.

According to the present invention, since hypochlorous acid, ozone or active oxygen is added to the for-treatment water in the second treating step, the ammonia or ammonium ions produced in the for-treatment water can be denitrified into a nitrogen gas efficiently.

Further, in the waste water treating method of the present invention, the polarities of the pair of electrodes each made of iron are switched therebetween in the first treating step.

According to the present invention, since the polarities of the pair of electrodes each made of iron are switched therebetween in the first treating step, formation of a coating such as an iron oxide on the surface of the electrode serving as the anode by an electrochemical process (electrolysis) can be prevented so as to prevent passivation of the anode from occurring.

Further, in the waste water treating method of the present invention, hypochlorous acid, ozone or active oxygen is produced in the for-treatment water by an electrochemical process in the second treating step.

According to the present invention, since hypochlorous acid, ozone or active oxygen is produced in the for-treatment water by an electrochemical process in the second treating step, the ammonia or ammonium ions in the for-treatment water can be caused to react with hypochlorous acid, ozone or active oxygen without using a special device to produce hypochlorous acid, ozone or active oxygen, whereby the ammonia or ammonium ions produced in the for-treatment water can be denitrified into a nitrogen gas more efficiently.

Further, since hypochlorous acid, ozone or active oxygen is produced in the for-treatment water containing the ammonia or ammonium ions, ozone or active oxygen which can exist only for a relatively short time can contribute to denitrification of the ammonia or ammonium ions effectively, thereby enhancing the effect of the treatment.

Further, in the waste water treating method of the present invention, the electrode serving as the cathode is made of a noble metal capable of producing hypochlorous acid, ozone or active oxygen by an electrochemical process or a conductive material coated with the noble metal, and the second treating step is carried out by switching the polarities of the pair of electrodes therebetween.

According to the present invention, since the electrode serving as the cathode is made of a noble metal capable of producing hypochlorous acid, ozone or active oxygen by an electrochemical process or a conductive material coated with the noble metal, and the second treating step is carried out by switching the polarities of the pair of electrodes therebetween, hypochlorous acid, ozone or active oxygen can be produced in the for-treatment water easily, and the ammonia or ammonium ions can be denitrified effectively accordingly.

Further, a nitrogen treating method of the present invention is a waste water treating method for treating a nitrogen compound and a phosphorus compound in for-treatment water, which comprises:

a first treating step of treating the for-treatment water by an electrochemical process by use of a pair of iron electrodes which are at least partially immersed in the for-treatment water, and a second treating step of treating the for-treatment water by an electrochemical process by use of a pair of electrodes which are at least partially immersed in the for-treatment water and are made of a noble metal or a conductive material coated with a noble metal.

According to the present invention, since the nitrogen treating method is a waste water treating method for treating a nitrogen compound and a phosphorus compound in for-treatment water which comprises a first treating step of treating the for-treatment water by an electrochemical process by use of a pair of iron electrodes which are at least partially immersed in the for-treatment water and a second treating step of treating the for-treatment water by an electrochemical process by use of a pair of electrodes which are at least partially immersed in the for-treatment water and are made of a noble metal or a conductive material coated with a noble metal, in the first treating step, iron(II) ions are eluted into the for-treatment water from one of the iron electrodes which serves as an anode, and iron(III) ions obtained by oxidation of the iron(II) ions in the for-treatment water chemically react with phosphate ions as a phosphorus compound in the for-treatment water, whereby the phosphorus compound in the for-treatment water can be precipitated as an iron phosphate.

Further, it becomes possible to reduce nitrate ions as a nitrogen compound in the for-treatment water to nitrite ions and ammonia or ammonium ions through oxidation of the iron(II) ions in the for-treatment water to the iron(III) ions or at one of the iron electrodes which serves as a cathode.

Further, by treating the for-treatment water by an electrochemical process by use of the pair of electrodes made of a noble metal or a conductive material coated with a noble metal in the second treating step after completion of the first treating step, hypochlorous acid, ozone or active oxygen can be produced in the for-treatment water. Thereby, the ammonia or ammonium ions produced in the for-treatment water in the first treating step can be denitrified into a nitrogen gas efficiently.

Further, in the waste water treating method of the present invention, the polarities of the pair of electrodes are switched therebetween in each of the treating steps.

According to the present invention, since the polarities of the pair of electrodes are switched therebetween in each of the treating steps, formation of a coating such as an iron oxide on the surface of the electrode serving as the anode by an electrochemical process (electrolysis) can be prevented so as to prevent passivation of the anode from occurring in the first treating step. Further, in the second treating step, formation of a coating (scale) on the surface of one of the electrodes which serves as a cathode and is made of a noble metal or a conductive material coated with a noble metal by an electrochemical process (electrolysis) can be prevented so as to prevent a decrease in effective area of the cathode from occurring.

Further, a waste water treating apparatus of the present invention is an apparatus for treating a nitrogen compound and a phosphorus compound in for-treatment water. The apparatus comprises a pair of electrodes which are at least partially immersed in the for-treatment water so as to treat the for-treatment water by an electrochemical process, and hypochlorous acid producing means for producing hypochlorous acid. In the apparatus, one of the electrodes is a cathode made of a conductive material and the other of the electrodes is an anode made of iron, and hypochlorous acid produced by the hypochlorous acid producing means is fed into the for-treatment water.

According to the present invention, since the waste water treating apparatus for treating a nitrogen compound and a phosphorus compound in for-treatment water comprises a pair of electrodes which are at least partially immersed in the for-treatment water so as to treat the for-treatment water by an electrochemical process and hypochlorous acid producing means for producing hypochlorous acid, one of the electrodes is a cathode made of a conductive material, and the other of the electrodes is an anode made of iron, iron(II) ions are eluted into the for-treatment water from the electrode serving as the anode, and iron(III) ions obtained by oxidation of the iron(II) ions in the for-treatment water chemically react with phosphate ions as a phosphorus compound in the for-treatment water, whereby the phosphorus compound in the for-treatment water can be precipitated as an iron phosphate.

Further, it becomes possible to reduce, in the for-treatment water or at the cathode, nitrate ions as a nitrogen compound in the for-treatment water to nitrite ions and ammonia or ammonium ions.

In addition, since hypochlorous acid produced by the hypochlorous acid producing means is fed into the for-treatment water, the ammonia or ammonium ions produced in the for-treatment water can be denitrified into a nitrogen gas efficiently.

Further, in the waste water treating apparatus of the present invention, the pair of electrodes are made of iron, and control means for switching the polarities of the electrodes therebetween is further provided.

According to the present invention, since the pair of electrodes are made of iron and the control means for switching the polarities of the electrodes therebetween is provided, formation of a coating such as an iron oxide on the surface of the electrode serving as the anode by an electrochemical process (electrolysis) can be prevented so as to prevent passivation of the anode from occurring.

Further, a waste water treating apparatus of the present invention is an apparatus for treating a nitrogen compound and a phosphorus compound in for-treatment water. The apparatus comprises a pair of electrodes which are at least partially immersed in the for-treatment water so as to treat the for-treatment water by an electrochemical process, and control means for switching the polarities of the electrodes therebetween. In the apparatus, one of the electrodes is a cathode made of a noble metal or a conductive material coated with a noble metal, and the other of the electrodes is an anode made of iron.

According to the present invention, since the waste water treating apparatus for treating a nitrogen compound and a phosphorus compound in for-treatment water comprises a pair of electrodes which are at least partially immersed in the for-treatment water so as to treat the for-treatment water by an electrochemical process and control means for switching the polarities of the electrodes therebetween, one of the electrodes is a cathode made of a noble metal or a conductive material coated with a noble metal, and the other of the electrodes is an anode made of iron, hypochlorous acid, ozone or active oxygen can be produced in the for-treatment water easily, and ammonia or ammonium ions can be denitrified effectively accordingly.

Further, a waste water treating apparatus of the present invention is an apparatus for treating a nitrogen compound and a phosphorus compound in for-treatment water. The apparatus comprises a pair of iron electrodes which are at least partially immersed in the for-treatment water so as to treat the for-treatment water by an electrochemical process, and a pair of electrodes which ate at least partially immersed in the for-treatment water so as to treat the for-treatment water by an electrochemical process and are made of a noble metal or a conductive material coated with a noble metal.

According to the present invention, since the waste water treating apparatus for treating a nitrogen compound and a phosphorus compound in for-treatment water comprises a pair of iron electrodes which are at least partially immersed in the for-treatment water so as to treat the for-treatment water by an electrochemical process, and a pair of electrodes which are at least partially immersed in the for-treatment water so as to treat the for-treatment water by an electrochemical process and are made of a noble metal or a conductive material coated with a noble metal, iron(II) ions are eluted into the for-treatment water from one of the iron electrodes which serves as an anode, and iron(III) ions obtained by oxidation of the iron(II) ions in the for-treatment water chemically react with phosphate ions as a phosphorus compound in the for-treatment water, whereby the phosphorus compound in the for-treatment water can be precipitated as an iron phosphate.

Further, it becomes possible to reduce nitrate ions as a nitrogen compound in the for-treatment water to nitrite ions and ammonia or ammonium ions through oxidation of the iron(II) ions in the for-treatment water to the iron(III) ions or at one of the iron electrodes which serves as a cathode.

In addition, by treating the for-treatment water by an electrochemical process by use of the pair of electrodes made of a noble metal or a conductive material coated with a noble metal, hypochlorous acid, ozone or active oxygen can be produced in the for-treatment water. Thereby, the ammonia or ammonium ions produced in the for-treatment water can be denitrified into a nitrogen gas efficiently.

Further, the waste water treating apparatus of the present invention also comprises control means for switching the polarities of each pair of electrodes therebetween.

According to the present invention, since the apparatus of the present invention further comprises the control means for switching the polarities of each pair of electrodes therebetween, formation of a coating such as an iron oxide on the surface of the iron electrode serving as an anode by an electrochemical process (electrolysis) can be prevented so as to prevent passivation of the anode from occurring. Further, formation of a coating (scale) on the surface of the electrode made of a noble metal or a conductive material coated with a noble metal and serving as a cathode by an electrochemical process (electrolysis) can be prevented so as to prevent a decrease in effective area of the cathode from occurring.

DETAILED DESCRIPTION OF THE PREFERRED EMBODIMENT

Figure 1:
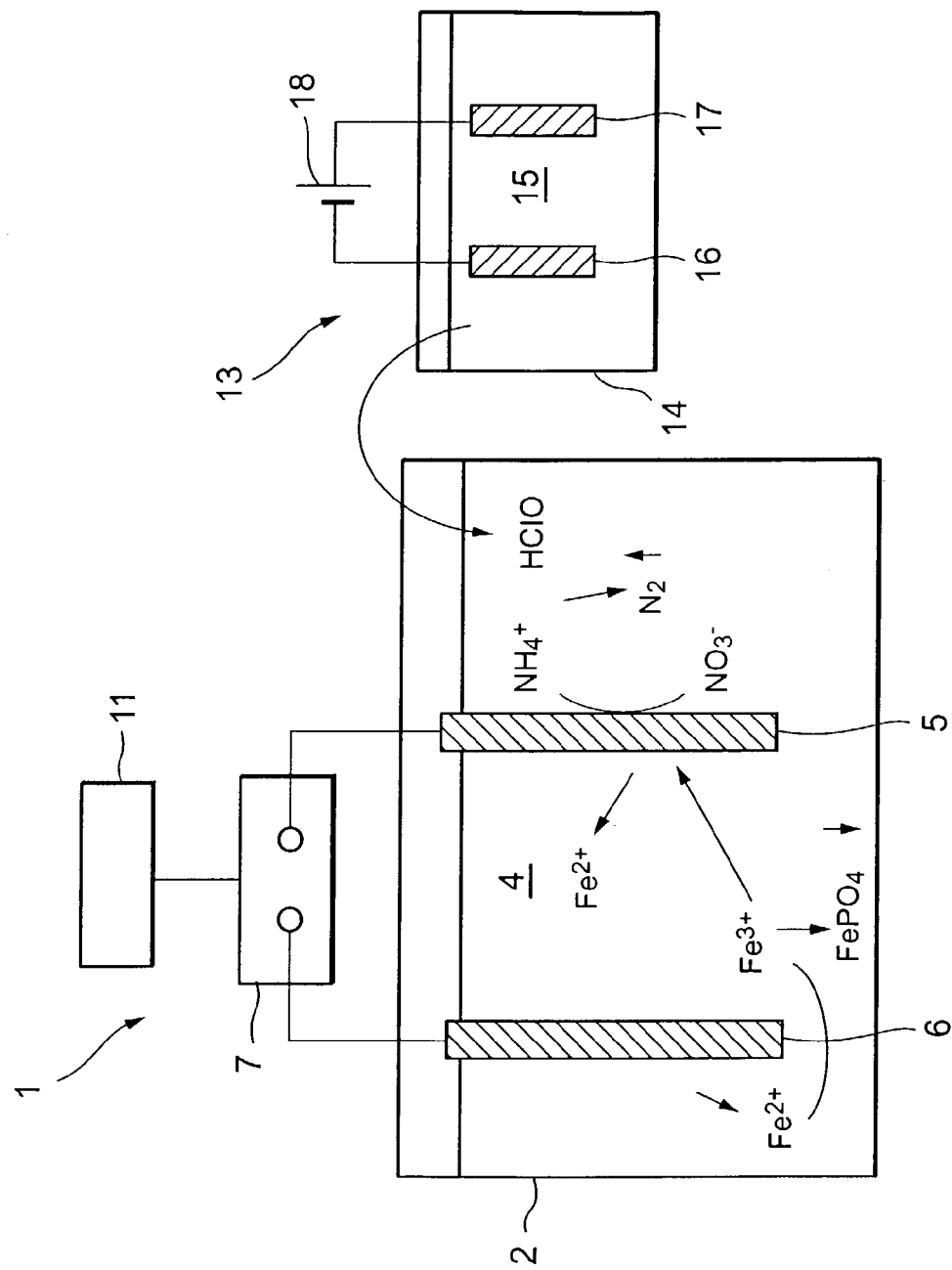
FIG. 1 is an explanatory diagram showing an overview of a waste water treating apparatus of the present invention.

Hereinafter, embodiments of the present invention will be described in detail with reference to the drawings. FIG. 1 is an explanatory diagram showing an overview of a waste water treating apparatus 1 for implementing a nitrogen/phosphorus treating method of the present invention. The waste water treating apparatus 1 in the present embodiment comprises a treating vessel 2 which constitutes a treating chamber 4 having an inlet and an outlet for waste water which are not shown in the chamber, a pair of electrodes disposed so as to confront each other and be at least partially immersed in for-treatment water in the treating chamber 4, i.e., an electrode 5 which serves as a cathode and an electrode 6 which serves as an anode, a power supply 7 for energizing the electrodes 5 and 6, and a controller 11 for controlling the power supply 7.

The electrode 6 serving as an anode is made of an iron material, and the electrode 5 serving as a cathode is made of a conductive material or an iron material as in the case of the electrode 6 in the present embodiment.

Further, in FIG. 1, reference numeral 13 denotes a hypochlorous acid producing device as hypochlorous acid feeding means for feeding hypochlorous acid into for-treatment water in the treating chamber 4. The hypochlorous acid producing device 13 is constituted by a hypochlorous acid producing vessel 14 which is provided independently of the treating vessel 2. The hypochlorous acid producing vessel 14 has a producing chamber 15 formed therein. In the producing chamber 15, water to be electrolyzed such as general service water containing, for example, 30 ppm of chloride ions is reserved. The producing chamber 15 comprises a pair of electrodes disposed so as to confront each other and be at least partially immersed in the for-electrolysis water, i.e., an electrode 16 which serves as a cathode and an electrode 17 which serves as an anode, and a power supply 18 for energizing the electrodes 16 and 17. To the for-electrolysis water, salt as a chloride ion regulator may be added. The electrodes 16 and 17 are electrodes made of a noble metal such as platinum or a mixture of platinum and iridium or a conductive material coated with noble metals.

When the electrodes 16 and 17 are energized by the power supply 18, the chloride ions contained in the for-electrolysis water release electrons so as to produce chlorine at the electrode 17 serving as an anode. Then, the chlorine dissolves in the water so as to produce hypochlorous acid. At this time, a trace amount of active oxygen such as ozone is also produced concurrently with hypochlorous acid.

Thus, in the hypochlorous acid producing device 13, hypochlorous acid, ozone and active oxygen are produced in the for-electrolysis water, and by feeding the electrolyzed water into the treating chamber 4 in the treating vessel 2, hypochlorous acid, ozone and active oxygen are fed into the for-treatment water in the treating chamber 4.

With the above constitution, in a first treating step, for-treatment water containing nitrate ions as nitrate nitrogen and phosphate ions as a phosphorus compound is reserved in the treating chamber 4 in the treating vessel 2, and the power supply 7 is turned on by the controller 11 so as to energize the electrodes 5 and 6. As a result, the for-treatment water is subjected to electrolysis as an electrochemical process. Since the electrode 6 serving as an anode is made of an iron material as described above, iron(II) ions are eluted into the for-treatment water from the electrode 6 and oxidized to iron(III) ions in the for-treatment water.

The produced iron(III) ions are agglomerated with the phosphate ions in the for-treatment water and precipitated as an iron phosphate which is hardly soluble in water, by a dephosphorylation reaction as shown by a reaction formula A.

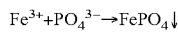

$Fe^{3+} + PO_4^{3-} \rightarrow FePO_4 \downarrow$  Reaction Formula A

Consequently, the phosphate ions as the phosphorus compound contained in the for-treatment water can be precipitated as the iron phosphate.

Meanwhile, the nitrate ions as nitrate nitrogen contained in the for-treatment water are reduced to nitrite ions (Reaction Formula B).

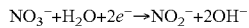

$NO_3^- + H_2O + 2e^- \rightarrow NO_2^- + 2OH^-$  Reaction Formula B

The nitrate nitrogen reduced to the nitrite ions is further reduced to ammonia (ammonium ions) (Reaction Formula C).

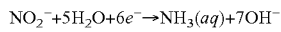

$NO_2^- + 5H_2O + 6e^- \rightarrow NH_3(aq) + 7OH^-$  Reaction Formula C

Further, some of the iron(III) ions resulting from oxidation of the iron(II) ions eluted into the for-treatment water for the purpose of feeding electrons, at the electrode or in the for-treatment water are provided with electrons at the electrode 5 serving as a cathode so as to be reduced to iron(II) ions and then oxidized again at the electrode 6 serving as an anode.

As for a technique of reducing nitrate ions contained in for-treatment water to ammonium ions by electrolysis of the for-treatment water containing iron(II) ions, it has already been disclosed in "Development of Technique of Treating Inorganic Nitrogen Compound Using Electrochemical Reaction" in Japan Water Environment Society Annual Meeting Lecture Collection distributed in the 33$^{rd}$ Japan Water Environment Society Annual Meeting held from Mar. 16 to 18, 1999.

Then, after completion of the first treating step, in a second treating step, hypochlorous acid and ozone or active oxygen produced by the hypochlorous acid producing device 13 as described above are fed (added) to the for-treatment water treated in the first treating step. As a result, ammonia produced in the first treating step in accordance with the reaction formula C and dissolved in the for-treatment water reacts with hypochlorous acid in the for-treatment water as shown by a reaction formula D so as to be denitrified into a nitrogen gas. Further, ammonia (ammonium ions) in the for-treatment water also reacts with active oxygen such as ozone as shown by a reaction formula E so as to be denitrified into a nitrogen gas.

Reaction Formula D $NH_3 + HClO \longrightarrow NH_2Cl + H_2O$ $NH_2Cl + HClO \longrightarrow NHCl_2 + H_2O$ $NH_2Cl + NHCl_2 \longrightarrow N_2\uparrow + 3HCl$

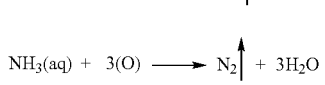

Reaction Formula E $NH_3(aq) + 3(O) \longrightarrow N_2\uparrow + 3H_2O$

Thus, ammonia produced in the for-treatment water can be denitrified into a nitrogen gas efficiently. Consequently, a nitrogen compound and a phosphorus compound in for-treatment water can be treated in the same treating vessel, there is no longer need to dispose a large-capacity biologically treating vessel, and increases in equipment construction costs and an apparatus installation area can be prevented.

Further, a complicated procedure of maintenance of denitrifying bacteria which is required in biological treatment can be obviated, and high nitrogen treatment efficiency can be provided stably.

In the present embodiment, the electrode 5 serving as a cathode as well as the electrode 6 serving as an anode is made of an iron material. Hence, polarities applied to the electrodes 5 and 6 can be switched therebetween, for example, once in a day, by the controller 11.

Thereby, elution of only the electrode 6 serving as an anode by electrolysis can be prevented, and by causing the electrodes 5 and 6 to elute alternately and equally, useful lives of the electrodes can be extended. Further, formation of a coating such as an iron oxide on the surface of the electrode 5 (or electrode 6 after their polarities have been switched therebetween) serving as an anode can be prevented so as to prevent passivation of the electrode 5 (or electrode 6) serving as an anode from occurring.

Further, in the present embodiment, to feed hypochlorous acid into the for-treatment water, electrolyzed water containing hypochlorous acid produced by the hypochlorous acid producing device 13 is fed into the for-treatment water. Alternatively, a hypochlorite (medicament) such as sodium hypochlorite may be added to the for-treatment water so as to introduce hypochlorous acid into the for-treatment water.

Figure 2:
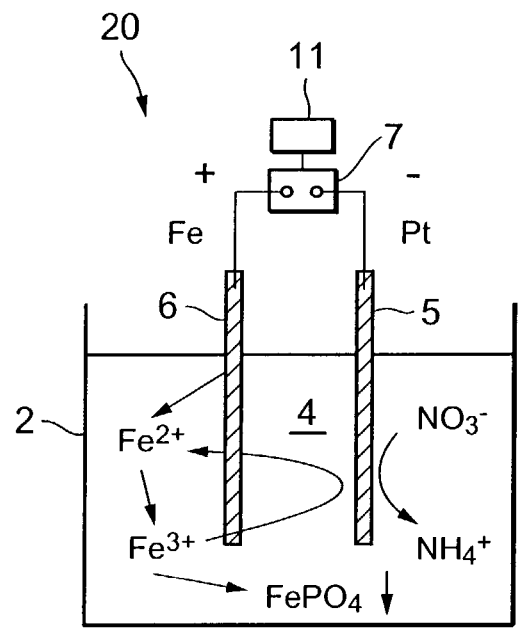
FIG. 2 is an explanatory diagram showing an overview of a waste water treating apparatus of a second embodiment.
Figure 3:
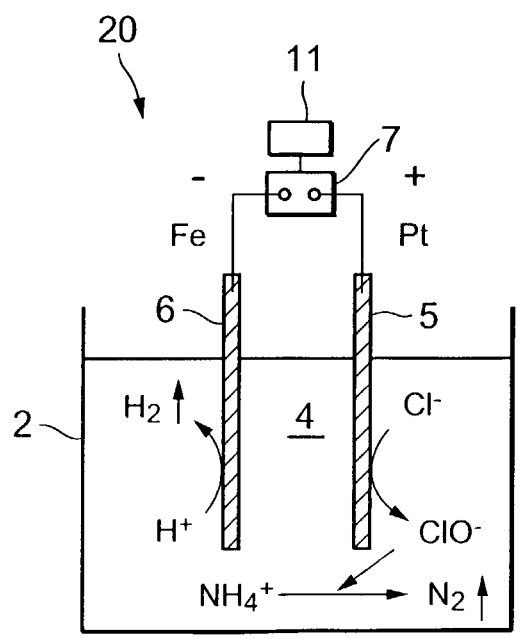
FIG. 3 is an explanatory diagram showing an overview of the waste water treating apparatus of the second embodiment.

Next, a waste water treating apparatus 20 as another embodiment for implementing the nitrogen/phosphorus treating method of the present invention will be described with reference to FIGS. 2 and 3. FIGS. 2 and 3 are explanatory diagrams showing an overview of the waste water treating apparatus 20. In FIGS. 2 and 3, components represented by the same reference numerals as found in FIG. 1 have the same or similar functions as those of components in FIG. 1 which are represented by the reference numerals. Further, in the present embodiment, one electrode 6 is made of an iron material, while the other electrode 5 is made of a noble metal such as platinum, iridium, palladium or an oxide thereof which can produce hypochlorous acid, ozone or active oxygen by an electrochemical process or an insoluble conductive material containing such a noble metal. In the present embodiment, the electrode 5 is made of platinum.

Figure 4:
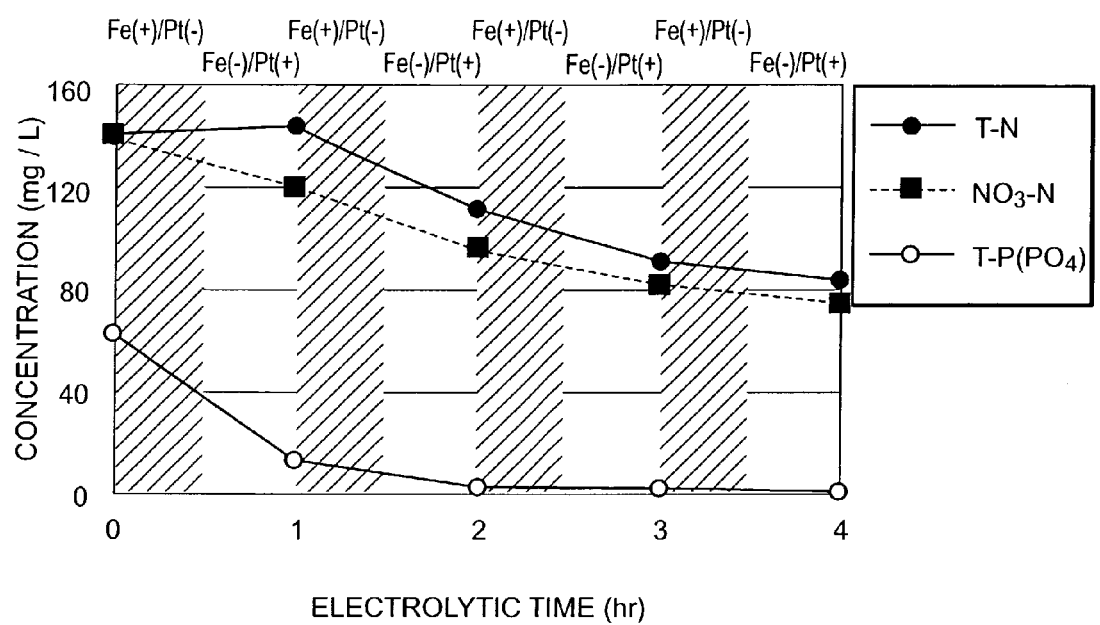
FIG. 4 is a diagram showing the results of an experiment conducted on the waste water treating apparatus of the second embodiment.

FIG. 4 shows the results of an experiment conducted with respect to the present embodiment. For-treatment water used in the experiment comprises 100 mM of KCl, 10 mM of $KNO_3$ and 2 mM of $K_2HPO_4$. Further, a constant current of 0.5 A is passing through the electrodes 5 and 6. In addition, the polarities of the electrodes 5 and 6 are switched therebetween, for example, every 30 minutes, by the controller 11.

Upon initiation of treatment, in a first treating step, the controller 11 turns on a power supply 7 so as to energize the iron electrode 6 serving as an anode and the platinum electrode 5 serving as a cathode. As a result, the above for-treatment water is subjected to electrolysis as an electrochemical process. Since the electrode 6 serving as an anode is made of iron as described above, iron(II) ions are eluted into the for-treatment water from the electrode 6 and oxidized to iron(III) ions in the for-treatment water.

The produced iron(III) ions are agglomerated with phosphate ions in the for-treatment water and precipitated as an iron phosphate which is hardly soluble in water, by a dephosphorylation reaction as shown by a reaction formula A.

$$Fe^{3+}+PO_4^{3-} \rightarrow FePO_4 \downarrow \quad \text{Reaction Formula A}$$

Thereby, the phosphate ions as a phosphorus compound which are contained in the for-treatment water can be precipitated as the iron phosphate.

Meanwhile, to the electrode 5 serving as a cathode, electrons produced at the electrode 6 serving as an anode are supplied, and nitrate ions as nitrate nitrogen which are contained in the for-treatment water are reduced to nitrite ions (Reaction Formula B).

$$NO_3^- + H_2O + 2e^- \rightarrow NO_2^- + 2OH^- \quad \text{Reaction Formula B}$$

Further, to the nitrate nitrogen reduced to the nitrite ions, electrons are supplied at the electrode 5 serving as a cathode, whereby the nitrate nitrogen is further reduced to ammonia (ammonium ions) (Reaction Formula C).

$$NO_2^- + 5H_2O + 6e^- \rightarrow NH_3(aq) + 2OH^- \quad \text{Reaction Formula C}$$

Further, some of the iron(III) ions resulting from oxidation of the iron(II) ions eluted into the for-treatment water for the purpose of feeding electrons, at the electrode or in the for-treatment water are provided with electrons at the electrode 5 serving as a cathode so as to be reduced to iron(II) ions and then oxidized again at the electrode 6 serving as an anode.

Then, after 30 minutes from initiation of the treatment, the controller 11 terminates the first treating step once and, in a second treating step, switches the polarities of the electrodes 5 and 6 therebetween so as to energize the platinum electrode 5 serving as an anode and the iron electrode 6 serving as a cathode as shown in FIG. 3.

As a result, at the electrode 5 serving as an anode, chloride ions contained in the for-treatment water release electrons so as to produce chlorine. Then, the chlorine dissolves in the water so as to produce hypochlorous acid. Since the electrode 5 serving as an anode is made of a noble metal such as platinum which is capable of producing hypochlorous acid, ozone or active oxygen by an electrochemical process (electrolysis) as described above and the chloride ions are contained in the for-treatment water (service water to be actually treated), hypochlorous acid and active oxygen such as ozone can be produced easily. Meanwhile, at the electrode 6 serving as a cathode, hydrogen ions contained in the for-treatment water take in electrons, thereby producing a hydrogen gas.

Then, hypochlorous acid and ozone or active oxygen produced in the for-treatment water react with ammonia produced in accordance with the reaction formula C and dissolved in the for-treatment water as described above as shown by a reaction formula D so as to denitrify ammonia into a nitrogen gas. Further, ammonia (ammonium ions) in the for-treatment water reacts with active oxygen such as ozone as shown by a reaction formula E so as to be denitrified into a nitrogen gas.

Reaction Formula D $$NH_3 + HClO \rightarrow NH_2Cl + H_2O$$
$$NH_2Cl + HClO \rightarrow NHCl_2 + H_2O$$
$$NH_2Cl + NHCl_2 \rightarrow N_2 \uparrow + 3HCl$$

Reaction Formula E $$NH_3(aq) + 3(O) \rightarrow N_2 \uparrow + 3H_2O$$

Thus, ammonia produced in the for-treatment water can be denitrified into the nitrogen gas efficiently. Further, the effect of removing the nitrate nitrogen and the phosphorus compound from the for-treatment water by the treatment as described above is also demonstrated by the experiment results shown in FIG. 4. The experiment results shown in FIG. 4 were obtained by sampling 1 ml of each of the amount of nitrate nitrogen contained in the for-treatment water and the amounts of all nitrogen and phosphorus in the for-treatment water upon initiation of the treatment, upon passage of 1 hour from the initiation of the treatment (or the point corresponding to second switching of polarities and first completion of the second treating step), upon passage of 2 hours from the initiation of the treatment, upon passage of 3 hours from the initiation of the treatment, and upon passage of 4 hours from the initiation of the treatment, diluting the samples in different proportions according to kinds of the samples to be analyzed, and quantifying the resulting samples by use of a calorimetric analyzer DR4000 of HACH CO., LTD.

As a result, the following were found. That is, at the start of the treatment, the amount of all nitrogen in the for-treatment water was 140 mg/L, the amount of nitrate nitrogen in the for-treatment water was 140 mg/L, and the amount of all phosphorus in the for-treatment water was 62 mg/L; upon passage of 1 hour from the start of the treatment, the amount of all nitrogen in the for-treatment water was 144 mg/L, the amount of nitrate nitrogen in the for-treatment water was 19 mg/L, and the amount of all phosphorus in the for-treatment water was 13 mg/L; upon passage of 2 hours from the start of the treatment, the amount of all nitrogen in the for-treatment water was 111 mg/L, the amount of nitrate nitrogen in the for-treatment water was 96 mg/L, and the amount of all phosphorus in the for-treatment water was 2 mg/L; upon passage of 3 hours from the start of the treatment, the amount of all nitrogen in the for-treatment water was 91 mg/L, the amount of nitrate nitrogen in the for-treatment water was 81 mg/L, and the amount of all phosphorus in the for-treatment water was 1.5 mg/L; and upon passage of 4 hours from the start of the treatment, the amount of all nitrogen in the for-treatment water was 84 mg/L, the amount of nitrate nitrogen in the for-treatment water was 75 mg/L, and the amount of all phosphorus in the for-treatment water was 0.5 mg/L.

It is understood from these results that the nitrogen compound and phosphorus compound in the for-treatment water can be treated effectively by carrying out the electrochemical treatment as described above.

Consequently, the nitrogen compound and phosphorus compound in the for-treatment water can be treated in the same treating vessel, there is no longer need to dispose a large-capacity biologically treating vessel, and increases in equipment construction costs and an apparatus installation area can be prevented.

Further, a complicated procedure of maintenance of denitrifying bacteria which is required in biological treatment can be obviated, and high nitrogen/phosphorus treatment efficiency can be provided stably.

Figure 5:
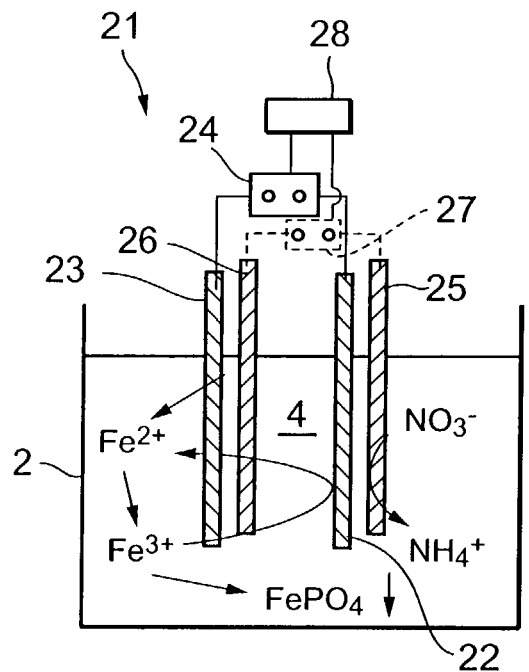
FIG. 5 is an explanatory diagram showing an overview of a waste water treating apparatus of a third embodiment.
Figure 6:
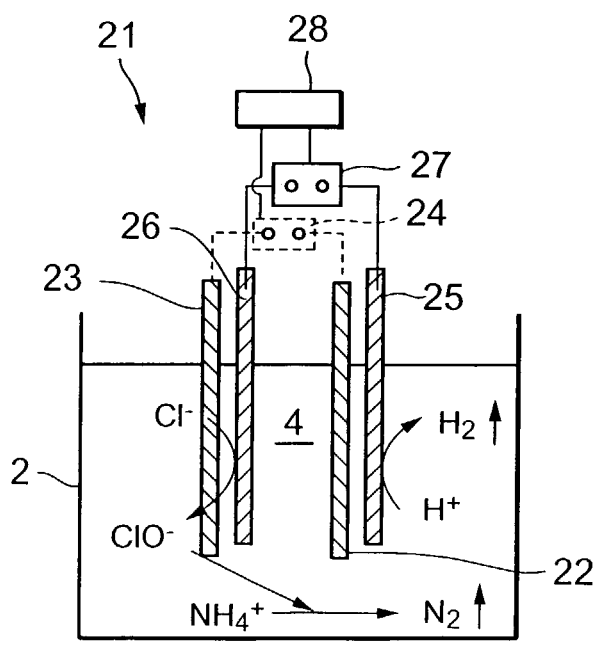
FIG. 6 is an explanatory diagram showing an overview of the waste water treating apparatus of the third embodiment.

Next, a waste water treating apparatus 21 as another embodiment for implementing the nitrogen/phosphorus treating method of the present invention will be described with reference to FIGS. 5 and 6. FIGS. 5 and 6 are explanatory diagrams showing an overview of the waste water treating apparatus 21. In FIGS. 5 and 6, components represented by the same reference numerals as found in FIG. 1 have the same or similar functions as those of components in FIG. 1 which are represented by the reference numerals.

The waste water treating apparatus 21 in the present embodiment comprises a pair of electrodes 22 and 23 which are disposed so as to confront each other and be at least partially immersed in for-treatment water in a treating chamber 4, a power supply 24 for energizing the electrodes 22 and 23, a pair of electrodes 25 and 26 which are disposed so as to confront each other and be at least partially immersed in the for-treatment water in the treating chamber 4, a power supply 27 for energizing the electrodes 25 and 26, and a controller 28 for controlling the power supplies 24 and 27.

One pair of electrodes 22 and 23 are made of an iron material, while the other pair of electrodes 25 and 26 are made of a noble metal such as platinum, iridium, palladium or an oxide thereof or an insoluble conductive material containing such a noble metal. In the present embodiment, the electrodes 25 and 26 are made of platinum.

Figure 7:
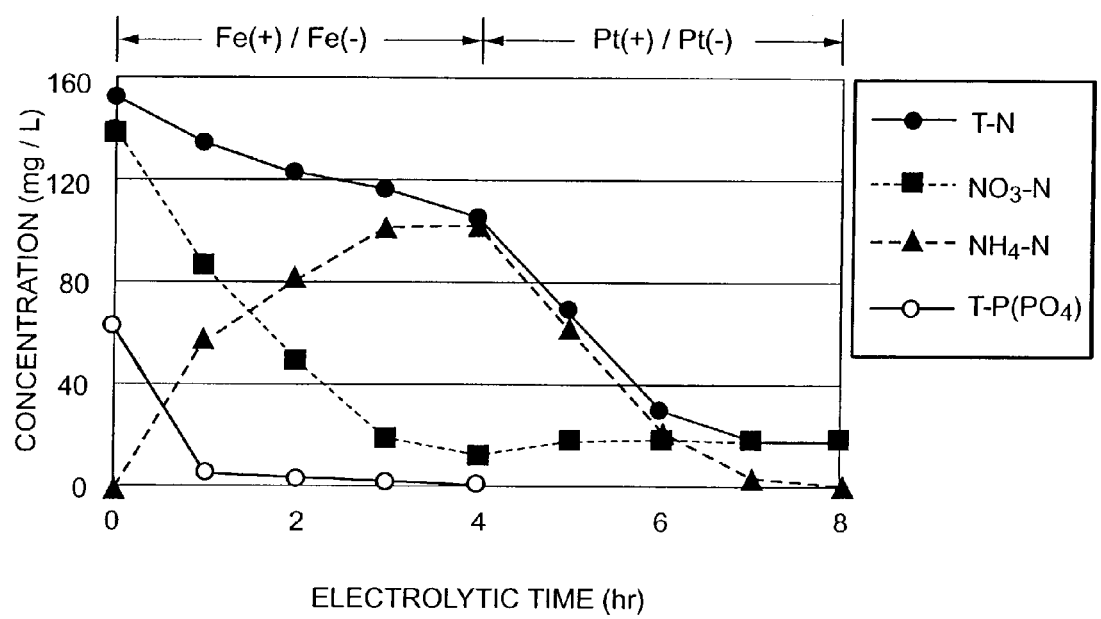
FIG. 7 is a diagram showing the results of an experiment conducted on the waste water treating apparatus of the third embodiment.

FIG. 7 shows the results of an experiment conducted with respect to the present embodiment. For-treatment water used in the experiment comprises 100 mM of KCl, 10 mM of $KNO_3$ and 2 mM of $K_2HPO_4$. Further, a constant current of 0.5 A is passing through the electrodes 22 and 23 or the electrodes 25 and 26.

Upon initiation of treatment, in a first treating step, the controller 28 turns on the power supply 24 and leaves the power supply 27 off so as to energize the iron electrodes 22 and 23. As a result, the above for-treatment water is subjected to electrolysis as an electrochemical process. Since the electrode 23 serving as an anode is made of iron as described above, iron(II) ions are eluted into the for-treatment water from the electrode 23 and oxidized to iron(III) ions in the for-treatment water.

The produced iron(III) ions are agglomerated with phosphate ions in the for-treatment water and precipitated as an iron phosphate which is hardly soluble in water, by a dephosphorylation reaction as shown by a reaction formula A.

$$Fe^{3+}+PO_4^{3-} \rightarrow FePO_4\downarrow \qquad \text{Reaction Formula A}$$

Thereby, the phosphate ions as a phosphorus compound which are contained in the for-treatment water can be precipitated as the iron phosphate.

Meanwhile, to the electrode 22 serving as a cathode, electrons produced at the electrode 23 serving as an anode are supplied, and nitrate ions as nitrate nitrogen which are contained in the for-treatment water are reduced to nitrite ions (Reaction Formula B).

$$NO_3^-+H_2O+2e^- \rightarrow NO_2^-+2OH^- \qquad \text{Reaction Formula B}$$

Further, to the nitrate nitrogen reduced to the nitrite ions, electrons are supplied at the electrode 22 serving as a cathode, whereby the nitrate nitrogen is further reduced to ammonia (ammonium ions) (Reaction Formula C).

$$NO_2^-+5H_2O+6e^- \rightarrow NH_3(aq)+7OH^- \qquad \text{Reaction Formula C}$$

Further, some of the iron(III) ions resulting from oxidation of the iron(II) ions eluted into the for-treatment water for the purpose of feeding electrons, at the electrode or in the for-treatment water are provided with electrons at the electrode 22 serving as a cathode so as to be reduced to iron(II) ions and then oxidized again at the electrode 23 serving as an anode.

Then, after completion of the first treating step, in a second treating step, the controller 28 turns off the power supply 24 and turns on the power supply 27 after, for example, about 4 hours from the start of the treatment, thereby energizing the platinum electrodes 25 and 26. As a result, at the electrode 26 serving as an anode, chloride ions contained in the for-treatment water release electrons so as to produce chlorine. Then, the chlorine dissolves in the water so as to produce hypochlorous acid. At this time, a trace amount of active oxygen such as ozone is also produced concurrently with hypochlorous acid. Meanwhile, at the electrode 25 serving as a cathode, hydrogen ions contained in the for-treatment water take in electrons, thereby producing a hydrogen gas.

Then, hypochlorous acid and ozone or active oxygen produced in the for-treatment water react with ammonia produced in accordance with the reaction formula C and dissolved in the for-treatment water as described above as shown by a reaction formula D so as to denitrify ammonia into a nitrogen gas. Further, ammonia (ammonium ions) in the for-treatment water reacts with active oxygen such as ozone as shown by a reaction formula E so as to be denitrified into a nitrogen gas.

$$NH_3 + HClO \rightarrow NH_2Cl + H_2O \qquad \text{Reaction Formula D}$$
$$NH_2Cl + HClO \rightarrow NHCl_2 + H_2O$$
$$NH_2Cl + NHCl_2 \rightarrow N_2\uparrow + 3HCl$$

$$NH_3(aq) + 3(O) \rightarrow N_2\uparrow + 3H_2O \qquad \text{Reaction Formula E}$$

Thus, ammonia produced in the for-treatment water can be denitrified into the nitrogen gas efficiently. Further, the effect of removing the nitrate nitrogen and the phosphorus compound from the for-treatment water by the treatment as described above is also demonstrated by the experiment results shown in FIG. 7. The experiment results shown in FIG. 7 were obtained by sampling 1 ml of each of the amount of all nitrogen contained in the for-treatment water, the amount of nitrate nitrogen in the for-treatment water, the amount of ammonia nitrogen in the for-treatment water, and the amount of all phosphorus in the for-treatment water upon initiation of the treatment and upon passages of 1 to 8 hours from the initiation of the treatment, diluting the samples in different proportions according to kinds of the samples to be analyzed, and quantifying the resulting samples by use of a calorimetric analyzer DR4000 of HACH CO., LTD.

From the start of the treatment to passage of 4 hours, the for-treatment water is electrolyzed by the iron electrodes 22 and 23 in the first treating step. Upon initiation of the first treating step, the amount of all nitrogen in the for-treatment water was 154 mg/L, the amount of nitrate nitrogen in the for-treatment water was 137 mg/L, the amount of ammonia nitrogen in the for-treatment water was 0, and the amount of all phosphorus in the for-treatment water was 62 mg/L. Meanwhile, upon passage of 4 hours from the initiation of the treatment, i.e., upon completion of the first treating step, the amount of all nitrogen in the for-treatment water was 106 mg/L, the amount of nitrate nitrogen in the for-treatment water was 12 mg/L, the amount of ammonia nitrogen in the for-treatment water was 101.7 mg/L, and the amount of all phosphorus in the for-treatment water was 1 mg/L.

It is understood from these results that when the for-treatment water was electrolyzed by the iron electrodes 22 and 23 in the first treating step, nitrate nitrogen in the for-treatment water reacted as described above to produce ammonia nitrogen. As for the amount of all phosphorus in the for-treatment water, it is understood that almost all phosphorus was treated, by comparing the amount of all phosphorus in the for-treatment water upon initiation of the treatment with that upon passage of 4 hours from the initiation of the treatment.

Further, from passage of 4 hours to passage of 8 hours from the initiation of the treatment, the for-treatment water was electrolyzed by the platinum electrodes 25 and 26 in the second treating step. It is understood from FIG. 7 that upon completion of the second treating step, the amounts of all nitrogen, nitrate nitrogen and ammonia nitrogen in the for-treatment water changed from the above values measured at the time of completion of the first treating step to 18 mg/L, 18 mg/L and 1 mg/L, respectively.

It is understood from these results that when the for-treatment water was electrolyzed by the iron electrodes 25 and 26 in the second treating step, ammonia nitrogen produced in the for-treatment water by the electrolysis using the iron electrodes 22 and 23 reacted as described above to be denitrified into a nitrogen gas.

It is understood from these results that the nitrogen compound and phosphorus compound in the for-treatment water can be treated effectively by carrying out the electrochemical treatment as described above.

Consequently, the nitrogen compound and phosphorus compound in the for-treatment water can be treated in the same treating vessel, there is no longer need to dispose a large-capacity biologically treating vessel, and increases in equipment construction costs and an apparatus installation area can be prevented.

Further, a complicated procedure of maintenance of denitrifying bacteria which is required in biological treatment can be obviated, and high nitrogen/phosphorus treatment efficiency can be provided stably.

The polarities of the iron electrodes 22 and 23 are switched therebetween by the controller 28 at appropriate timing during the electrolysis. Thereby, elution of only the electrode 23 serving as an anode by the electrolysis can be prevented, and by causing the electrodes 22 and 23 to elute alternately and equally, useful lives of the electrodes can be extended. Further, formation of a coating such as an iron oxide on the surface of the electrode 22 (or electrode 23 after their polarities have been switched therebetween) serving as an anode can be prevented so as to prevent passivation of the electrode 22 (or electrode 23) serving as an anode from occurring.

Further, the polarities of the platinum electrodes 25 and 26 are also switched therebetween by the controller 28 at appropriate timing during the electrolysis. Thereby, formation of a coating (scale) on the surface of the electrode 25 (or electrode 26) serving as a cathode can be prevented so as to prevent a decrease in effective area of the cathode from occurring.

As described in detail above, according to the present invention, by carrying out a first treating step in which a pair of electrodes, one of which is a cathode made of a conductive material and the other of which is an anode made of iron, are at least partially immersed in for-treatment water so as to treat the for-treatment water by an electrochemical process, iron(II) ions are eluted into the for-treatment water from the electrode serving as the anode, and iron(III) ions obtained by oxidation of the iron(II) ions in the for-treatment water chemically react with phosphate ions as a phosphorus compound in the for-treatment water, whereby the phosphorus compound in the for-treatment water can be precipitated as an iron phosphate.

Further, it becomes possible to reduce, in the for-treatment water or at the cathode, nitrate ions as a nitrogen compound in the for-treatment water to nitrite ions and ammonia or ammonium ions.

In addition, since a second treating step in which the for-treatment water is treated with hypochlorous acid, ozone or active oxygen is carried out after completion of the first treating step, the ammonia or ammonium ions produced in the for-treatment water can be denitrified into a nitrogen gas efficiently.

Further, according to the present invention, since hypochlorous acid, ozone or active oxygen is added to the for-treatment water in the second treating step, the ammonia or ammonium ions produced in the for-treatment water can be denitrified into a nitrogen gas efficiently.

Further, according to the present invention, since the polarities of the pair of electrodes each made of iron are switched therebetween in the first treating step, formation of a coating such as an iron oxide on the surface of the electrode serving as the anode by an electrochemical process (electrolysis) can be prevented so as to prevent passivation of the anode from occurring.

Further, according to the present invention, since hypochlorous acid, ozone or active oxygen is produced in the for-treatment water by an electrochemical process in the second treating step, the ammonia or ammonium ions in the for-treatment water can be caused to react with hypochlorous acid, ozone or active oxygen without using a special device to produce hypochlorous acid, ozone or active oxygen, whereby the ammonia or ammonium ions produced in the for-treatment water can be denitrified into a nitrogen gas more efficiently.

Further, since hypochlorous acid, ozone or active oxygen is produced in the for-treatment water containing the ammonia or ammonium ions, ozone or active oxygen which can exist only for a relatively short time can contribute to denitrification of the ammonia or ammonium ions effectively, thereby enhancing the effect of the treatment.

Further, according to the present invention, since the electrode serving as the cathode is made of a noble metal capable of producing hypochlorous acid, ozone or active oxygen by an electrochemical process or a conductive material coated with the noble metal, and the second treating step is carried out by switching the polarities of the pair of electrodes therebetween, hypochlorous acid, ozone or active oxygen can be produced in the for-treatment water easily, and the ammonia or ammonium ions can be denitrified effectively accordingly.

Further, according to the present invention, a waste water treating method of the present invention is a waste water treating method for treating a nitrogen compound and a phosphorus compound in for-treatment water which comprises a first treating step of treating the for-treatment water by an electrochemical process by use of a pair of iron electrodes which are at least partially immersed in the for-treatment water and a second treating step of treating the for-treatment water by an electrochemical process by use of a pair of electrodes which are at least partially immersed in the for-treatment water and are made of a noble metal or a conductive material coated with a noble metal. Hence, in the first treating step, iron(II) ions are eluted into the for-treatment water from one of the iron electrodes which serves as an anode, and iron(III) ions obtained by oxidation of the iron(II) ions in the for-treatment water chemically react with phosphate ions as a phosphorus compound in the for-treatment water, whereby the phosphorus compound in the for-treatment water can be precipitated as an iron phosphate.

Further, it becomes possible to reduce nitrate ions as a nitrogen compound in the for-treatment water to nitrite ions and ammonia or ammonium ions through oxidation of the iron(II) ions in the for-treatment water to the iron(III) ions or at one of the iron electrodes which serves as a cathode.

Further, by treating the for-treatment water by an electrochemical process by use of the pair of electrodes made of a noble metal or a conductive material coated with a noble metal in the second treating step after completion of the first treating step, hypochlorous acid, ozone or active oxygen can be produced in the for-treatment water. Thereby, the ammonia or ammonium ions produced in the for-treatment water in the first treating step can be denitrified into a nitrogen gas efficiently.

Further, according to the present invention, since the polarities of the pair of electrodes are switched therebetween in each of the treating steps, formation of a coating such as an iron oxide on the surface of the electrode serving as an anode by an electrochemical process (electrolysis) can be prevented so as to prevent passivation of the anode from occurring in the first treating step. Further, in the second treating step, formation of a coating (scale) on the surface of one of the electrodes which serves as a cathode and is made of a noble metal or a conductive material coated with a noble metal by an electrochemical process (electrolysis) can be prevented so as to prevent passivation of the cathode from occurring.

Further, according to the present invention, a waste water treating apparatus of the present invention is a waste water treating apparatus for treating a nitrogen compound and a phosphorus compound in for-treatment water. The apparatus comprises a pair of electrodes which are at least partially immersed in the for-treatment water so as to treat the for-treatment water by an electrochemical process, and hypochlorous acid producing means for producing hypochlorous acid. One of the electrodes is a cathode made of a conductive material and the other of the electrodes is an anode made of iron. Accordingly, iron(II) ions are eluted into the for-treatment water from the electrode serving as the anode, and iron(III) ions obtained by oxidation of the iron(II) ions in the for-treatment water chemically react with phosphate ions as a phosphorus compound in the for-treatment water, whereby the phosphorus compound in the for-treatment water can be precipitated as an iron phosphate.

Further, it becomes possible to reduce, in the for-treatment water or at the cathode, nitrate ions as a nitrogen compound in the for-treatment water to nitrite ions and ammonia or ammonium ions.

In addition, since hypochlorous acid produced by the hypochlorous acid producing means is fed into the for-treatment water, the ammonia or ammonium ions produced in the for-treatment water can be denitrified into a nitrogen gas efficiently.

Further, according to the present invention, since the pair of electrodes are made of iron, and control means for switching the polarities of the electrodes therebetween is further provided, formation of a coating such as an iron oxide on the surface of the electrode serving as the anode by an electrochemical process (electrolysis) can be prevented so as to prevent passivation of the anode from occurring.

Further, according to the present invention, a waste water treating apparatus of the present invention is a waste water treating apparatus for treating a nitrogen compound and a phosphorus compound in for-treatment water. The apparatus comprises a pair of electrodes which are at least partially immersed in the for-treatment water so as to treat the for-treatment water by an electrochemical process, and control means for switching the polarities of the electrodes therebetween. In the apparatus, one of the electrodes is a cathode made of a noble metal or a conductive material coated with a noble metal, and the other of the electrodes is an anode made of iron. Accordingly, hypochlorous acid, ozone or active oxygen can be produced in the for-treatment water easily, and ammonia or ammonium ions can be denitrified effectively accordingly.

Further, according to the present invention, a waste water treating apparatus of the present invention is a waste water treating apparatus for treating a nitrogen compound and a phosphorus compound in for-treatment water. The apparatus comprises a pair of iron electrodes which are at least partially immersed in the for-treatment water so as to treat the for-treatment water by an electrochemical process, and a pair of electrodes which are at least partially immersed in the for-treatment water so as to treat the for-treatment water by an electrochemical process and are made of a noble metal or a conductive material coated with a noble metal. Accordingly, iron(II) ions are eluted into the for-treatment water from one of the iron electrodes which serves as an anode, and iron(III) ions obtained by oxidation of the iron(II) ions in the for-treatment water chemically react with phosphate ions as a phosphorus compound in the for-treatment water, whereby the phosphorus compound in the for-treatment water can be precipitated as an iron phosphate.

Further, it becomes possible to reduce nitrate ions as a nitrogen compound in the for-treatment water to nitrite ions and ammonia or ammonium ions in the for-treatment water or at one of the iron electrodes which serves as a cathode.

In addition, by treating the for-treatment water by an electrochemical process by use of the pair of electrodes made of a noble metal, hypochlorous acid, ozone or active oxygen can be produced in the for-treatment water. Thereby, the ammonia or ammonium ions produced in the for-treatment water can be denitrified into a nitrogen gas efficiently.

Further, according to the present invention, since the apparatus further comprises control means for switching the polarities of each pair of electrodes therebetween, formation of a coating such as an iron oxide on the surface of the iron electrode serving as an anode by an electrochemical process (electrolysis) can be prevented so as to prevent passivation of the anode from occurring. Further, formation of a coating (scale) on the surface of the electrode made of a noble metal or a conductive material coated with a noble metal and serving as a cathode by an electrochemical process (electrolysis) can be prevented so as to prevent a decrease in effective area of the cathode from occurring.

What is claimed is:

1. A waste water treating method for treating a nitrogen compound and a phosphorous compound in for-treatment water, which comprises:
    a first treating step of immersing a pair of electrodes in the for-treatment water at least partially so as to treat the for-treatment water by an electrochemical process, one of the electrodes being a cathode made of a conductive material and the other of the electrodes being an anode made of iron, such that the nitrogen compound is converted to nitrite ions and ammonia or ammonium ions and the phosphorous compound is precipitated as iron phosphate in said first treating step, and
    a second treating step of treating the for-treatment water with hypochlorous acid, ozone or active oxygen after completion of the first treating step, such that ammonia or ammonium ions are denitrified to nitrogen gas in said second treating step.

2. The method of claim 1, wherein hypochlorous acid, ozone or active oxygen is added to the for-treatment water in the second treating step.

3. The method of claim 1 or 2, wherein the polarities of the pair of electrodes each made of iron are switched therebetween in the first treating step.

4. The method of claim 1, wherein hypochlorous acid, ozone or active oxygen is produced in the for-treatment water by an electrochemical process in the second treating step.

5. The method of claim 1 or 4, wherein the electrode serving as the cathode is made of a noble metal capable of producing hypochlorous acid, ozone or active oxygen by an electrochemical process or a conductive material coated with the noble metal, and the second treating step is carried out by switching the polarities of the pair of electrodes therebetween.

6. A waste water treating method for treating a nitrogen compound and a phosphorous compound in for-treatment water, which comprises:
    a first treating step of treating the for-treatment water by use of a pair of iron electrodes which are at least partially immersed in the for-treatment water, such that the nitrogen compound is converted to nitrite ions and ammonia or ammonium ions and the phosphorous compound is precipitated as iron phosphate in said first treating step, and
    a second treating step of treating the for-treatment water by an electrochemical process by use of a pair of electrodes which are at least partially immersed in the for-treatment water and are made of a noble metal or a conductive material coated with a noble metal, such that ammonia or ammonium ions are denitrified to nitrogen gas in said second treating step.

7. The method of claim 6, wherein the polarities of the pair of electrodes are switched therebetween in each of the treating steps.

8. A waste water treating apparatus for treating a nitrogen compound and a phosphorous compound in for-treatment water, the apparatus comprising:
    a pair of electrodes which are at least partially immersed in the for-treatment water so as to treat the for-treatment water by an electrochemical process,
    hypochlorous acid producing means for producing hypochlorous acid, and means for feeding hypochlorous acid produced by the hypochlorous acid producing means into the for-treatment water,
    wherein one of the electrodes is a cathode made of a conductive material, whereas the other of the electrodes is an anode made of iron.

9. The apparatus of claim 8, wherein the pair of electrodes are made of iron, and control means for switching the polarities of the electrodes therebetween is further provided.

10. A waste water treating apparatus for treating a nitrogen compound and a phosporus compound in for-treatment water, the apparatus comprising:
    a pair of electrodes which are at least partially immersed in the for-treatment water so as to treat the for-treatment water by an electrochemical process, and
    control means for switching the polarities of the electrodes therebetween,
    one of the electrodes being a cathode made of a noble metal or a conductive material coated with a noble metal, the other of the electrodes being an anode made of iron.

11. A waste water treating apparatus for treating a nitrogen compound and a phosphorus compound in for-treatment water, the apparatus comprising:
    a pair of electrodes which are at least partially immersed in the for-treatment water so as to treat the for-treatment water by an electrochemical process, and
    a pair of electrodes which are at least partially immersed in the for-treatment water so as to treat the for-treatment water by an electrochemical process and are made of a noble metal or a conductive material coated with a noble metal.

12. The apparatus of claim 11, further comprising control means for switching the polarities of each pair of electrodes therebetween.

* * * * *